US012640358B2

(12) United States Patent
Spaun et al.

(10) Patent No.: US 12,640,358 B2
(45) Date of Patent: May 26, 2026

(54) ULTRA-HIGH VACUUM SEAL, ASSEMBLY, AND METHOD OF MAKING THE SAME

(71) Applicant: Quantinuum LLC, Broomfield, CO (US)

(72) Inventors: Benjamin Norman Spaun, Westminster, CO (US); Tyler Davis Hilbun, Broomfield, CO (US); Riley Dewitt Ancona, Westminster, CO (US); Jason Anthony Fuqua, Dacono, CO (US)

(73) Assignee: QUANTINUUM LLC, Broomfield, CO (US)

( * ) Notice: Subject to any disclaimer, the term of this patent is extended or adjusted under 35 U.S.C. 154(b) by 409 days.

(21) Appl. No.: 18/493,105

(22) Filed: Oct. 24, 2023

(65) Prior Publication Data

US 2024/0355607 A1 Oct. 24, 2024

Related U.S. Application Data

(60) Provisional application No. 63/479,407, filed on Jan. 11, 2023.

(51) Int. Cl.
*H01J 49/24* (2006.01)
*H01J 5/22* (2006.01)

(52) U.S. Cl.
CPC ................ *H01J 49/24* (2013.01); *H01J 5/22* (2013.01); *H01J 2209/264* (2013.01); *H01J 2209/267* (2013.01); *H01J 2209/268* (2013.01)

(58) Field of Classification Search
CPC ........ H01J 49/24; H01J 5/22; H01J 2209/264; H01J 2209/267
See application file for complete search history.

(56) References Cited

U.S. PATENT DOCUMENTS

2021/0335591 A1* 10/2021 Kim ........................ H01J 49/24
2022/0084709 A1 3/2022 Hughes

FOREIGN PATENT DOCUMENTS

KR 10-2016-0032976 A 3/2016

OTHER PUBLICATIONS

Wilpers et al., "A compact UHV package for microfabricated ion trap arrays with direct electronic air-side access", Applied Physics B , 2013 (Year: 2013).*
Chinese patent Publication 114335318 A (Year: 2022).*
Kaufmann, Delia, et al., "Thick-film technology for ultra high vacuum interfaces of micro-structured traps", submitted Jan. 26, 2012 to Cornell University Library Online Archive available on the Internet at https://arxiv.org/pdf/1107.4082v2, 9 pages.

(Continued)

*Primary Examiner* — Nicole M Ippolito
(74) *Attorney, Agent, or Firm* — Alston & Bird LLP

(57) ABSTRACT

An ultra-high vacuum seal assembly includes a circuit board, a first ring, and a second ring. The first ring and the second ring include indium. The circuit board includes a first surface and a second surface that is opposite the first surface. The circuit board also includes a via array that is in electrical communication with the first surface and the second surface of the circuit board. The first ring is positioned directly on the first surface of the circuit board and the second ring is positioned directly on the second surface of the circuit board.

20 Claims, 3 Drawing Sheets

(56) References Cited

OTHER PUBLICATIONS

Kaufmann, Delia, et al., "Thick-film technology for ultra high vacuum interfaces of micro-structured traps", submitted Jul. 20, 2011 to Cornell University Library Online Archive available on the Internet at https://arxiv.org/pdf/1107.4082v1, 8 pages.
Outgoing—ISA/210—International Search Report Mailed on Feb. 23, 2024 for WO Application No. PCT/US23/078386, 4 page(s).
Outgoing Written Opinion of the ISA Mailed on Feb. 23, 2024 for WO Application No. PCT/US23/078386, 9 page(s).
Wilpers, Guido, et al., "A compact UHV package for microfabricated ion-trap arrays with direct electronic air-side access", Applied Physics B, Apr. 1, 2013, pp. 21-28, vol. 111, No. 1, Springer, Germany, retrieved from the Internet: URL:https://link.springer.com/content/pdf/ 10.1007/s00340-012-5302-4.pdf>.

* cited by examiner

ULTRA-HIGH VACUUM SEAL, ASSEMBLY, AND METHOD OF MAKING THE SAME

CROSS-REFERENCE TO RELATED APPLICATIONS

This application claims the benefit of U.S. Provisional Patent Application No. 63/479,407, filed Jan. 11, 2023, the entire contents of which are incorporated by reference herein.

TECHNICAL FIELD

The present application relates generally to an ultra-high vacuum seal assembly, an ultra-high vacuum assembly, and method of making the ultra-high vacuum seal assembly. More specifically, the present application relates generally to an ultra-high vacuum seal assembly, an ultra-high vacuum assembly, and method of making the ultra-high vacuum seal assembly for a quantum computer.

BACKGROUND

Quantum computers often require electrical signals to transmit from an out-of-vacuum source to an in-vacuum source. However, traditional methods, such as pin-type electrical feedthrough methods, may not achieve high density transmission of the electrical signals, such as fifty signals or more per square inch. Additionally, traditional methods may require an electrical feedthrough apparatus of an electrical feedthrough assembly to be bonded to various other components of the electrical feedthrough assembly, which may make the electrical feedthrough apparatus difficult, or impossible, to reuse once dissembled from the various other components of the electrical feedthrough assembly. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include methods and apparatuses to provide for an ultra-high vacuum seal assembly, an ultra-high vacuum assembly, and a method of making the ultra-high vacuum seal assembly.

In various aspects, an ultra-high vacuum assembly for a quantum computer is provided. The ultra-high vacuum assembly can include a plate, an enclosure, and an ultra-high vacuum seal assembly positioned between the plate and the enclosure. The ultra-high vacuum seal assembly can include a circuit board, a first ring, and a second ring. The circuit board can include a first surface and a second surface that is opposite the first surface. The circuit board can also include a via array that is in electrical communication with the first surface and the second surface of the circuit board. The first ring can be positioned directly on the first surface of the circuit board and the second ring can be positioned directly on the second surface of the circuit board. In various examples, the first ring and the second ring include indium (In).

In various examples, the ultra-high vacuum seal assembly can further include a first gasket and a second gasket, the first ring and the second ring can be positioned between the first gasket and the second gasket. The first gasket can include at least one of copper (Cu), aluminum (Al), or gold (Au), and the second gasket can include at least one of Cu, Al, or Au.

In various examples, the enclosure can include a groove. The second ring and the second gasket can be positioned within the groove of the enclosure such that the enclosure makes contact with the second surface of the circuit board, when the ultra-high vacuum assembly is assembled. In various examples, the second ring can be positioned within the groove of the enclosure such that the enclosure is positioned directly on the second surface of the circuit board, when the ultra-high vacuum assembly is assembled.

In various examples, the circuit board can include at least one of aluminum nitride (AlN) or alumina (Al2O3). Also, a thickness of the circuit board can be at least 120 mils.

In various examples, the ultra-high vacuum assembly can include a bolt, the bolt can extend through the circuit board. Also, the bolt can extend, at least partially, through the plate and the enclosure.

In various examples, the enclosure of the ultra-high vacuum assembly can include a chamber that can be configured to withstand a pressure less than 100 nanopascals (nPa). The circuit board can be configured to provide a hermetic seal between the chamber and an ambient environment. In various examples, the ultra-high vacuum assembly can include a vacuum pump and the vacuum pump can be in fluid communication with the chamber. In various examples, the vacuum pump causes, or is configured to cause, the pressure that is less than the 100 nPa to the chamber.

In various aspects, an ultra-high vacuum seal assembly for a quantum computer is provided. The ultra-high vacuum seal assembly can include a circuit board, a first ring, and a second ring. The circuit board can include a first surface and a second surface that is opposite the first surface. The circuit board can also include a via array that is in electrical communication with the first surface and the second surface of the circuit board. In various examples, the first ring and the second ring can include indium (In).

In various examples, the ultra-high vacuum seal assembly can include a first gasket and a second gasket. The first ring and the second ring can be positioned between the first gasket and the second gasket.

In various aspects, a method of manufacturing an ultra-high vacuum seal assembly is provided. The method can include preparing at least a portion of a first ring and at least a portion of a second ring with an acid, which can be HCl. The method can also include pressing the first ring on a first surface of a substrate and pressing the second ring on a second surface of the substrate, wherein the first surface of the substrate is opposite the second surface of the substrate. The first ring and the second ring can include indium. The method can also include forming a via array on the substrate such that the via array is in electrical communication with the first surface and the second surface of the substrate.

In various examples, forming the via array on the substrate can be performed before pressing the first ring on the first surface of the substrate and before pressing the second ring on the second surface of the substrate.

In various examples, the method can include pressing a first gasket on the first ring and pressing a second gasket on the second ring. The first gasket can include at least one of Cu, Al, or Au, and the second gasket can include at least one of Cu, Al, or Au.

In various examples, the substrate can include aluminum nitride (AlN) or alumina (Al2O3). In various examples, a thickness of the substrate can be at least 120 mils.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
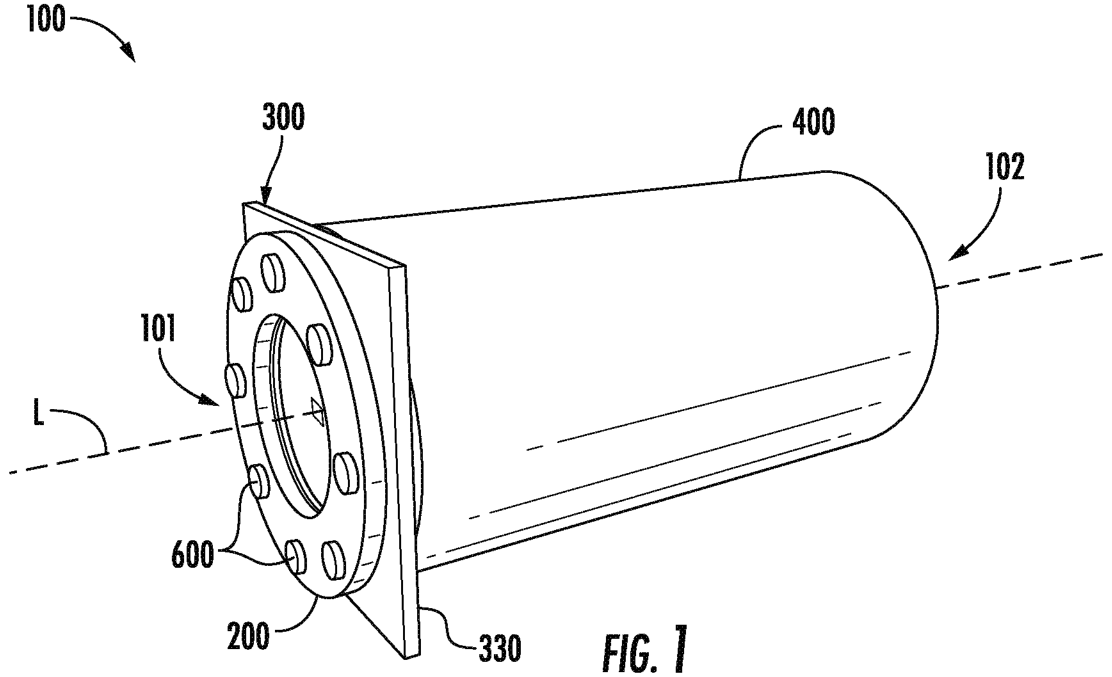

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a perspective view of an ultra-high vacuum (UHV) assembly, in accordance with an example embodiment.

Figure 2:
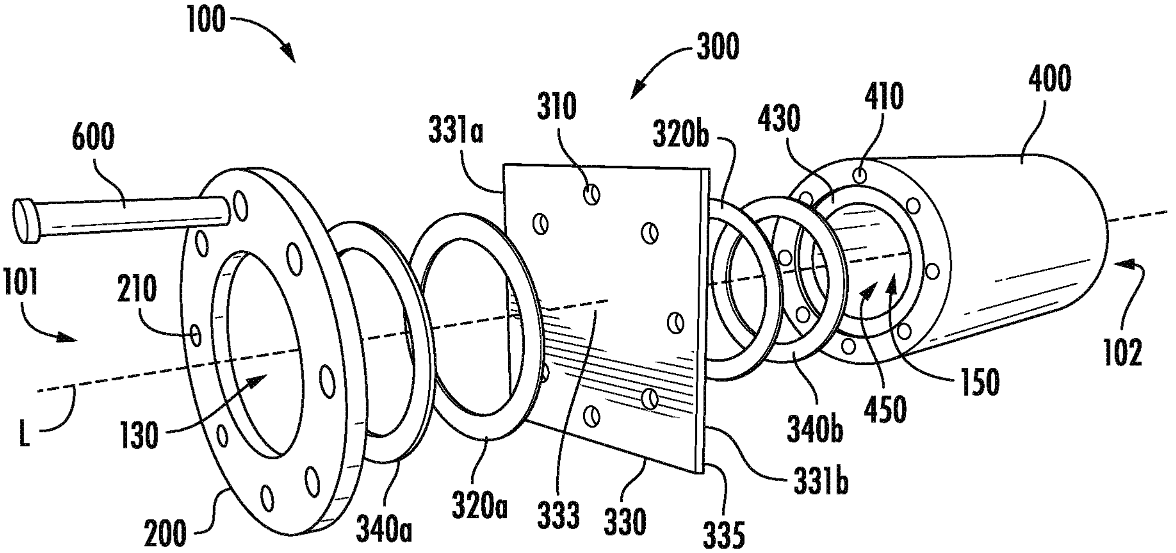

FIG. 2 provides a perspective, exploded view of the UHV assembly of FIG. 1, in accordance with an example embodiment.

Figure 3:
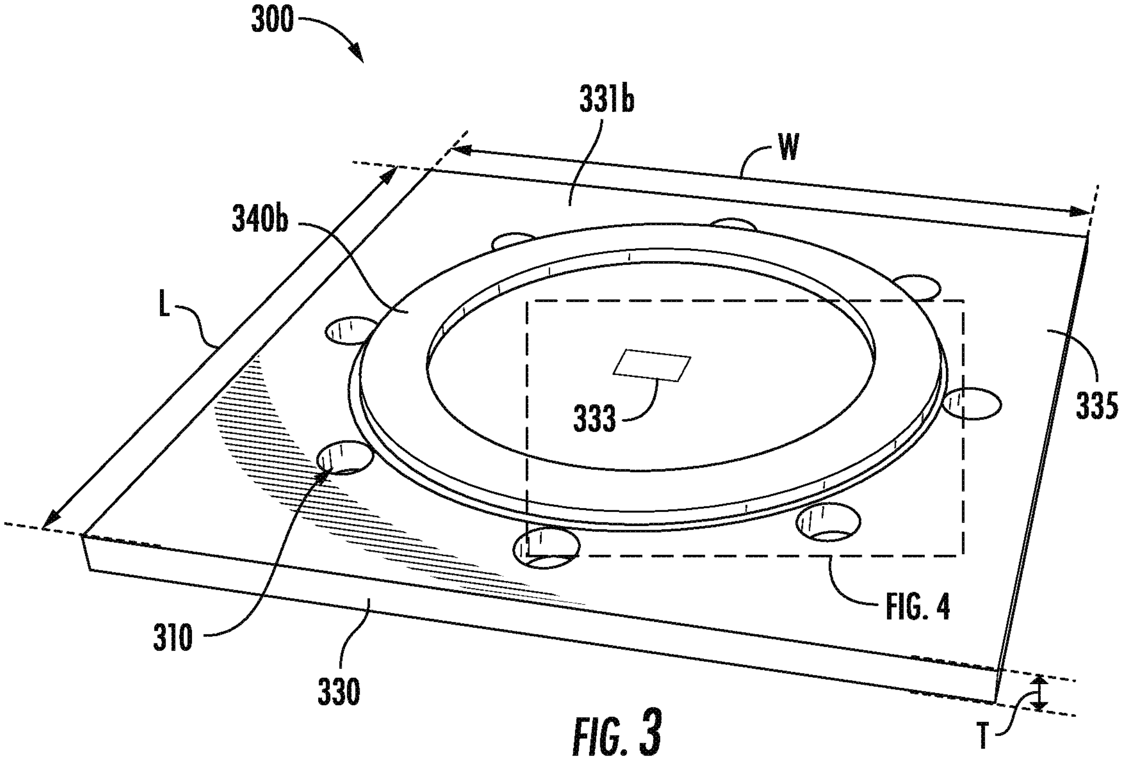

FIG. 3 provides a perspective view of a UHV seal assembly of the UHV assembly of FIG. 1, in accordance with an example embodiment.

Figure 4:
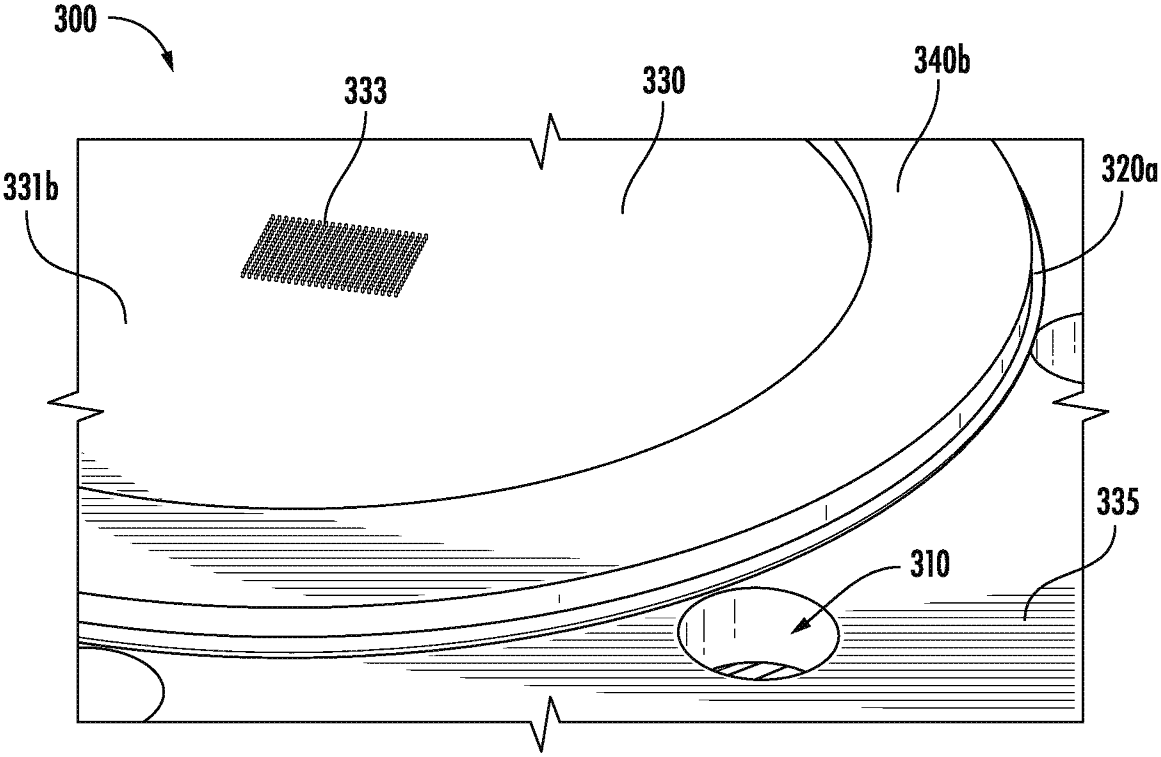

FIG. 4 provides a close-up, perspective view of the UHV seal assembly of FIG. 3, in accordance with an example embodiment.

Figure 5:
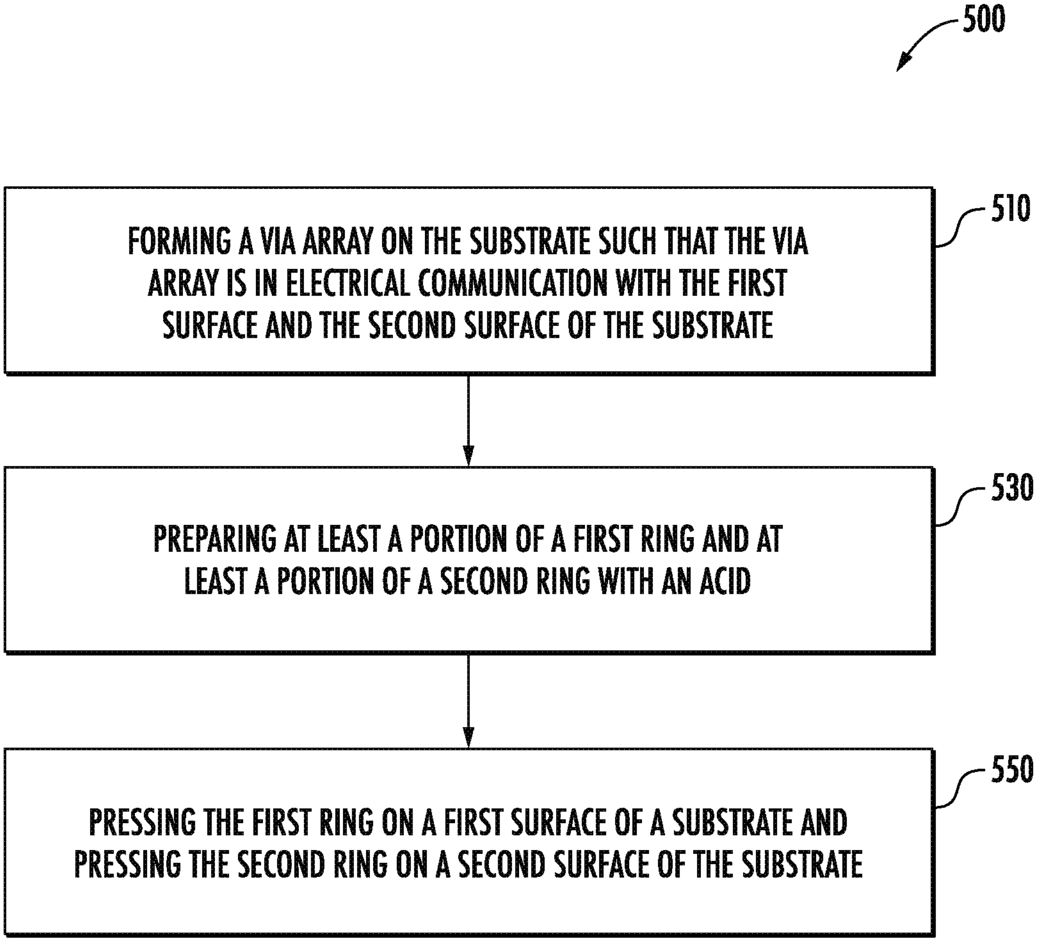

FIG. 5 provides a flowchart of a method of manufacturing a UHV seal assembly of the UHV assembly of FIG. 1, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "fluid" may be a gas or a liquid. The term "fluid communication" means that a fluid is capable of making the connection between the areas specified. As used herein, the terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "electrical communication" means that an electric current and/or electric signals are capable of making the connection between the areas specified.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

Referring now to FIG. 1, a perspective view of an ultra-high vacuum (UHV) assembly 100 is provided, in accordance with an example embodiment. The UHV assembly 100 can be configured for use in a quantum computer, such as a superconducting quantum computer, quantum charge-coupled device (QCCD)-based quantum computer, and/or other type of quantum computer operated under vacuum conditions. For example, the UHV assembly 100 can be configured for housing and/or enclosing an ion trap of a quantum computer and/or used in conjunction with a particle accelerator and/or any physical system requiring electrical communication into or out of an ultra-high vacuum environment. For example, the UHV assembly 100 can be configured for use in other devices or machines, such as a magnetic resonance imaging (MRI) machine.

In the illustrated embodiment, the UHV assembly 100 includes a plate 200, an enclosure 400, and a UHV seal assembly 300 that is positioned between the plate 200 and the enclosure 400. The UHV enclosure 400 defines a longitudinal axis L of the UHV assembly 100. The UHV assembly has a first end 101 and a second end 102. In various embodiments, the first end 101 and the second end 102 of the UHV assembly 100 are disposed opposite one another with respect to the longitudinal axis L.

The plate 200, the UHV seal assembly 300, and the enclosure 400 can be coupled together with a plurality of bolts 600. The plate 200 can be ring shaped and can encircle the longitudinal axis L. The enclosure 400 can be shaped as a hollow cylinder and can encircle the longitudinal axis L. For example, in an example embodiment, the longitudinal axis of the hollow cylinder of the enclosure 400 defines the longitudinal axis L of the UHV assembly 100. In various embodiments, the cross-section of the enclosure 400 in a plane perpendicular to the longitudinal axis L is a circle, ellipse, polygon, or other regular or irregular shape.

Referring now to FIG. 2, a perspective, exploded view of the UHV assembly 100 of FIG. 1 is provided, in accordance with an example embodiment. As shown in this view, the UHV seal assembly 300 can include a first ring 320*a*, a second ring 320*b*, and a circuit board 330 that is positioned between, such as positioned directly between, the first ring 320*a* and the second ring 320*b*. The first ring 320*a* and the second ring 320*b* can be manufactured from, or include, indium (In). In various examples, the first ring 320*a* can be positioned directly on a first surface 331*a* of the circuit board 330 and the second ring 320*b* can be positioned directly on a second surface 331*b* of the circuit board 330. The first surface 331*a* and the second surface 331*b* of the circuit board 330 can be opposite of each other such that they each face opposite directions along the longitudinal axis L.

Referring still to FIG. 2, the UHV seal assembly 300 can include a first gasket 340*a* that is positioned between, such as positioned directly between, the plate 200 and the first ring 320*a* and a second gasket 340*b* that is positioned between, such as positioned directly between, the second ring 320*b* and the enclosure 400. The first gasket 340*a* and the second gasket 340*b* can be manufactured from, or include, copper (Cu), aluminum (Al), gold (Au), or mixtures thereof.

In various examples, the plate 200 can include a groove (not shown) and the enclosure 400 can include a groove 430. The first ring 320*a*, or the first ring 320*a* and the first gasket 340*a*, can be positioned within the groove of the plate 200 such that the first ring 320*a* is flush with an inward facing surface of the plate 200. Similarly, the second ring 320*b*, or the second ring 320*b* and the second gasket 340*b*, can be positioned within the groove 430 of the enclosure 400 such that the second ring 320*b* is flush with an inward facing surface of the enclosure 400. As used in this context, the term "inward facing surface" refers to a surface that faces in a direction towards the circuit board 330 along the longitudinal direction L. In contrast, the term "outward facing surface" refers to a surface that faces in a direction away from the circuit board 330 along the longitudinal direction L.

When the first ring 320*a*, or the first ring 320*a* and the first gasket 340*a*, are positioned within the groove of the plate 200 such that the first ring 320*a* is flush with the inward facing surface of the plate 200, the plate 200 makes contact with the circuit board 330 when the UHV assembly is assembled. Similarly, when the second ring 320*b*, or the second ring 320*b* and the second gasket 340*b*, are positioned within the groove 430 of the enclosure 400 such that the second ring 320*b* is flush with the inward facing surface of the enclosure 400, the enclosure 400 makes contact with the circuit board 330 when the UHV assembly is assembled. Positioning the plate 200 and the enclosure 400 such that they make contact with the circuit board 330 may increase the amount of sealing provided by the UHV seal assembly 300.

As discussed, the plate 200, the UHV seal assembly 300, and the enclosure 400 can be coupled together with the plurality of bolts 600 (only one bolt 600 shown in the FIG. 2 view for simplicity). As best seen in this view, the plate 200 can include a plurality of bolt holes 210, the circuit board 330 of the UHV seal assembly 300 can include a plurality of bolt holes 310, and the enclosure 400 can include a plurality of bolt holes 410. The bolt holes 210, 310, 410 of the plate 200, the circuit board 330, and the enclosure 400 can be aligned such that they can accommodate the plurality of bolts 600. As shown, the plurality of bolts 600 can extend through the plate 200, through the circuit board 330, and at least partially through the enclosure 400. However, in various examples, the plurality of bolts 600 can extend through the enclosure 400, the circuit board 330, and at least partially through the plate 200. In yet other examples, the plurality of bolts 600 may extend completely through the plate 200, the circuit board 330, and the enclosure 400, and a nut can be provided to secure the plate 200, the circuit board 330, and the enclosure 400 together. In various examples, the first ring 320*a*, the second ring 320*b*, or both, include bolt holes that can also accommodate the plurality of bolts 600.

As discussed, the enclosure 400 can be shaped as a hollow cylinder. The hollow cylinder shape of the enclosure 400 can define a chamber 450. The UHV assembly 100 can include, or can be associated with, a vacuum pump (not shown). The vacuum pump can be in fluid communication with the chamber 450 of the enclosure 400 and can be configured to generate at least a partial vacuum within the chamber 450 of the enclosure 400. In various examples, the vacuum pump is positioned downstream from the chamber 450 of the enclosure 400 such that any fluids, such as air, that are within the chamber 450 of the enclosure may flow from the chamber 450 towards the vacuum pump. In effect, the vacuum pump may remove, at least partially, such as at least mostly, any fluids that are within the chamber 450 of the enclosure. In some examples, the vacuum pump is configured to generate an ultra-high vacuum, such as pressures lower than 100 nanopascals (nPa) (approximately $7.5\times10^{-10}$ Torr).

Referring now to FIG. 3 and FIG. 4, perspective views of the UHV seal assembly 300 of the UHV assembly 100 of FIG. 1 is provided, in accordance with an example embodiment. As best seen in these views, the circuit board 330 can include a via array 333. The via array 333 can extend through a substrate 335 of the circuit board 330 such that the via array 333 is in electrical communication with both the first surface 331*a* (FIG. 1) and the second surface 331*b* of the circuit board 330. Additionally, electrical connections (not shown) can be coupled to the first surface 331*a* and the second surface 331*b* of the circuit board 330. The via array 333, or the via array 333 and the electrical connections, can be configured to transmit electrical signals, such as isolated electrical signals, from the first surface 331*a* to the second surface 331*b*, or from an area proximate to the first surface 331*a* to an area proximate to the second surface 331*b*, of the circuit board 330.

In various examples, the via array 333, or the via array 333 and the electrical connections, may create an electrical pathway between the chamber 450 of the enclosure 400 (FIG. 2) and the area within the ring-shaped plate 200 (FIG. 2) (e.g., exterior to the chamber 450). In various examples, the via array 333, or the via array 333 and the electrical connections, may create an electrical pathway that extends from an area outside of the second gasket 340*b* to an area within the first gasket 340*a*, or vice-versa. When the chamber 450 of the enclosure 400 is under vacuum, the via array 333, or the via array 333 and the electrical connections, may create an electrical pathway between the in-vacuum portion 150 (FIG. 2) of the UHV assembly 100, which includes the chamber 450 of the enclosure 400, and the out-of-vacuum portion 130 (FIG. 2) of the UHV assembly 100, which includes the area within the ring shaped plate 200.

Including a via array 333 on the circuit board 330 has various benefits. For example, the via array 333 may allow for high density transmission of the electrical signals. More specifically, the via array 333 may allow for a transmission of 50 signals or more per square inch, such as one hundred signals or more per square inch, such as two hundred signals or more per square inch. In contrast, traditional methods, such as pin-type feedthrough methods, may not allow for the transmission of 50 signals or more per square inch. Additionally, traditional methods, such as pin-type feedthrough methods, may be bulkier than the solutions that are structured in accordance with the embodiments of the present disclosure.

Referring briefly back to FIG. 2, the UHV seal assembly 300 can be configured to provide a hermetic seal between the out-of-vacuum portion 130 of the UHV assembly 100 and the in-vacuum portion 150 of the UHV assembly 100. The in-vacuum portion 150 of the UHV assembly 100 can include any portion of the UHV assembly 100 that is in fluid communication with the vacuum pump (not shown), or configured to be in fluid communication with the vacuum pump. Also, the in-vacuum portion 150 of the UHV assembly 100 can include any portion of the UHV assembly 100 that is configured to experience the ultra-high vacuum, such as pressures lower than 100 nPa, such as the chamber 450 of the enclosure 400. The out-of-vacuum portion 130 of the UHV assembly 100 can include any portion of the UHV assembly 100 that is not in fluid communication with the vacuum pump, or configured to not be in fluid communication with the vacuum pump. Also, the out-of-vacuum portion 130 of the UHV assembly 100 can include any portion of the UHV assembly 100 that is configured to experience pressures higher than the ultra-high vacuum, such as pressures higher than 100 nPa, such as pressures higher than 100 megapascal (mPa), such as pressures higher than 90 kilopascals (kPa). In various examples, the out-of-vacuum portion 130 of the UHV assembly 100 is configured to experience ambient pressures.

Referring again to FIG. 3, the substrate 335 of the circuit board 330 can be manufactured from, or include, aluminum nitride (AlN), alumina (Al2O3), or mixtures or alloys thereof. Also, the substrate 335 of the circuit board 330 has a length L, a width W, and a thickness T. In various examples, the length L can be at least 2 inches and up to 10 inches, such as at least 3 inches and up to 7 inches, such as at least 4 inches and up to 5 inches, such as 4.5 inches. In various examples, the width W can be at least 2 inches and up to 10 inches, such as at least 3 inches and up to 7 inches, such as at least 4 inches and up to 5 inches, such as 4.5 inches. In various examples, the length L of the circuit board 330 is equal to the width W of the circuit board 330. The length L and the width W of the circuit board 330 can both be at least 2 inches and up to 10 inches. The thickness T can be at least 120 mils and up to 500 mils, such as at least 150 mils and up to 300 mils, such as at least 180 mils and up to 200 mils, such as 190 mils.

As discussed, the UHV seal assembly 300 can be configured to provide a hermetic seal between the out-of-vacuum portion 130 of the UHV assembly 100 and the in-vacuum portion 150 of the UHV assembly 100. Because, in various examples, the in-vacuum portion 150 of the UHV assembly 100 may experience the ultra-high vacuum, such as pressure lower than 100 nPa, it may be beneficial for the thickness T of the circuit board 330 to be greater than a certain thickness, such as at least 120 mils and up to 500 mils, such as at least 150 mils and up to 300 mils, such as at least 180 mils and up to 200 mils, such as 190 mils. This certain thickness may be able to structurally withstand the ultra-high vacuum. Additionally, because, in various examples, the in-vacuum portion 150 of the UHV assembly 100 may experience the ultra-high vacuum, it may be beneficial for the substrate 335 of the circuit board 330 to be manufactured from, or to include, certain materials that can allow the circuit board 330 to structurally withstand the ultra-high vacuum. For example, it may be beneficial to manufacture the substrate 335 of the circuit board 330 from a ceramic, such as AlN, Al2O3, or mixtures thereof, to withstand the ultra-high vacuum.

Also, because the UHV seal assembly 300 can be configured to provide the hermetic seal between the out-of-vacuum portion 130 of the UHV assembly 100 and the in-vacuum portion 150 of the UHV assembly 100, it may be beneficial to manufacture the first gasket 340*a* and the second gasket 340*b*, when included, from a relatively soft metal, such as Cu, Al, Au, or mixtures thereof, to increase the amount of sealing between components of the UHV assembly 100, such as between the plate 200 and the first ring 320*a* and between the enclosure 400 and the second ring 320*b*. As will be appreciated, softer materials provide for better sealing than harder materials. Therefore, the relatively soft metals (e.g., a hardness that is less than or equal to 4 on the Mohs hardness scale) may provide better sealing capabilities than hard metals (e.g., a hardness that is greater than 4 on the Mohs hardness scale), such as Titanium (Ti) or Tungsten (W). Similarly, it may be beneficial to manufacture the first ring 320*a* and the second ring 320*b* such that they include indium (In), which is a relatively soft metal, to provide for sufficient sealing between components of the UHV assembly 100, such as between the circuit board 330 and the first gasket 340*a* and between the circuit board 330 and the second gasket 340*b*. In various examples, the first ring 320*a* and the second ring 320*b* include, or are manufactured from, indium oxide (In2O3).

Including the UHV seal assembly 300 in the UHV assembly 100 has various benefits. For example, as discussed, the UHV seal assembly 300 can provide a hermetic seal between the in-vacuum portion 150 of the UHV assembly 100 and the out-of-vacuum portion 130 of the UHV assembly 100. Additionally, and as also discussed, the UHV seal assembly 300 can allow for electrical signals to transmit from the out-of-vacuum portion 130 of the UHV assembly 100 to the in-vacuum portion 150 of the UHV assembly 100, and vice versus.

Referring now to FIG. 5, a flowchart of a method 500 of manufacturing the UHV seal assembly 300 is provided, in accordance with an example embodiment. The method 500 can include a step 510 of forming the via array 333 on the substrate 335 such that the via array 333 is in, or is configured to be in, electrical communication with the first surface 331*a* and the second surface 331*b* of the substrate 335.

The method 500 can include a step of 530 of preparing at least a portion of a first ring 320*a* and at least a portion of a second ring 320*b* with an acid. For example, the surfaces of the first ring 320*a* and the second ring 320*b* that are to face and make contact with the circuit board 330, or the substrate 335 of the circuit board 330, can be prepared with the acid. In various examples, the acid is hydrochloric acid (HCl). Preparing the first ring 320*a* and the second ring 320*b* with the acid, such as HCl, may remove, or strip, the oxidation from the first ring 320*a* and the second ring 320*b*. In the various examples where the first ring 320*a* and the second ring 320*b* are In2O3 and the acid is HCl, the HCl may remove the oxidization from the In2O3, which may form pure indium at least in the portions of the first ring 320*a* and the second ring 320*b* that are prepared with the HCl (e.g., the prepared surfaces of the first ring 320*a* and the second ring 320*b*). As will be appreciated, the pure indium may surface bond to ceramics. More specifically, and as will be appreciated, pure indium may bond to ceramics with a cold-welding process. In various examples, the pure indium may surface bond to the substrate 335 when it includes, or is, AlN and/or Al2O3, which are ceramics. More specifically, the cold-welding process may be used to bond the pure indium portions of the first ring 320*a* and the second ring 320*b* to the substrate 335 when they include, or are, a ceramic, such as AlN or Al2O3, in various examples.

The method 500 can include a step 550 of pressing the first ring 320*a* on the first surface 331*a* of the substrate 335 and pressing the second ring 320*b* on the second surface 331*b* of the substrate 335. In various examples, the amount of pressing force in step 550 is at least 100 pounds per square inch (psi). Step 550 can also include applying an adhesive, such as an epoxy, to the first ring 320*a*, the second ring 320*b*, the first surface 331*a* of the substrate 335, and/or the second surface 331*b* of the substrate. However, using the described surface bonding process, such as the cold-welding process, may allow the first ring 320*a* and the second ring 320*b* to be bonded to the substrate 335 without the use of an adhesive. Bonding the first ring 320*a* and the second ring 320*b* to the substrate 335 without the use of adhesive has various benefits. For example, bonding the first ring 320*a* and the second ring 320*b* to the substrate 335 without the use of adhesive may allow for the UHV assembly 100 to be disassembled and the components (e.g., the circuit board 330, the first ring 320*a*, the second ring 320*b*, the first gasket 340*a*, and/or the second gasket 340*b*) to be reused.

Method 500 of manufacturing the UHV seal assembly 300 may also include positioning and/or pressing the first gasket 340*a* onto the first ring 320*a* and positioning and/or pressing the second gasket 340*b* onto the second ring 320*b*. In various examples, an adhesive, such as an epoxy, can be used to bond the first gasket 340*a* to the first ring 320*a* and the second gasket 340*b* to the second ring 320*b*. However, in other examples, an adhesive is not used.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An ultra-high vacuum assembly for a quantum computer, the ultra-high vacuum assembly comprising:

a plate;

an enclosure; and an ultra-high vacuum seal assembly positioned between the plate and the enclosure, wherein the ultra-high vacuum seal assembly comprises:

a circuit board comprising a first surface and a second surface that is opposite the first surface, wherein the circuit board further comprises a via array that is in electrical communication with the first surface and the second surface;

a first ring positioned directly on the first surface of the circuit board; and a second ring positioned directly on the second surface of the circuit board, wherein the first ring and the second ring comprise indium (In).

2. The ultra-high vacuum assembly of claim 1, wherein the ultra-high vacuum seal assembly further comprises a first gasket and a second gasket, wherein the first ring and the second ring are positioned between the first gasket and the second gasket.

3. The ultra-high vacuum assembly of claim 2, wherein the first gasket comprises at least one of copper (Cu), aluminum (Al), or gold (Au), and wherein the second gasket comprises at least one of Cu, Al, or Au.

4. The ultra-high vacuum assembly of claim 2, wherein the enclosure comprises a groove, wherein the second ring and the second gasket are positioned within the groove of the enclosure, wherein the enclosure makes contact with the second surface of the circuit board.

5. The ultra-high vacuum assembly of claim 1, wherein the enclosure comprises a groove, wherein the second ring is positioned within the groove of the enclosure, wherein the enclosure is positioned directly on the second surface of the circuit board.

6. The ultra-high vacuum assembly of claim 1, wherein the circuit board comprises at least one of aluminum nitride (AlN) or alumina (Al2O3).

7. The ultra-high vacuum assembly of claim 1, further comprising a bolt, wherein the bolt extends through the circuit board, and wherein the bolt extends, at least partially, through the plate and the enclosure.

8. The ultra-high vacuum assembly of claim 1, wherein a thickness of the circuit board is at least 120 mils.

9. The ultra-high vacuum assembly of claim 1, wherein the enclosure comprises a chamber that is configured to withstand a pressure less than 100 nanopascals (nPa), wherein the circuit board is configured to provide a hermetic seal between the chamber and an ambient environment.

10. The ultra-high vacuum assembly of claim 1, further comprising a vacuum pump, wherein the enclosure comprises a chamber, and wherein the vacuum pump is in fluid communication with the chamber.

11. An ultra-high vacuum seal assembly for a quantum computer, the ultra-high vacuum seal assembly comprising:

a circuit board comprising a first surface and a second surface that is opposite the first surface, wherein the circuit board further comprises a via array that is in electrical communication with the first surface and the second surface;

a first ring positioned directly on the first surface of the circuit board; and a second ring positioned directly on the second surface of the circuit board, wherein the first ring and the second ring comprise indium (In).

12. The ultra-high vacuum seal assembly of claim 11, wherein the ultra-high vacuum seal assembly further comprises a first gasket and a second gasket, wherein the first ring and the second ring are positioned between the first gasket and the second gasket.

13. The ultra-high vacuum seal assembly of claim 12, wherein the first gasket comprises at least one of copper (Cu), aluminum (Al), or gold (Au), and wherein the second gasket comprises at least one of Cu, Al, or Au.

14. The ultra-high vacuum seal assembly of claim 12, wherein the second ring and the second gasket are configured to be positioned within a groove of an enclosure that makes contact with the second surface of the circuit board.

15. A method of manufacturing an ultra-high vacuum seal assembly, the method comprising:

forming a via array on a substrate such that the via array is in electrical communication with a first surface and a second surface of the substrate;

preparing at least a portion of a first ring and at least a portion of a second ring with an acid, wherein the first ring and the second ring comprise indium (In); and pressing the first ring on the first surface of the substrate and pressing the second ring on the second surface of the substrate, wherein the first surface of the substrate is opposite the second surface of the substrate.

16. The method of claim 15, further comprising pressing a first gasket on the first ring and pressing a second gasket on the second ring.

17. The method of claim 16, wherein the first gasket comprises at least one of copper (Cu), aluminum (Al), or gold (Au), and wherein the second gasket comprises at least one of Cu, Al, or Au.

18. The method of claim 15, wherein the substrate comprises at least one of aluminum nitride (AlN) or alumina (Al2O3).

19. The method of claim 15, wherein a thickness of the substrate is at least 120 mils.

20. The method of claim 15, wherein the acid is hydrochloric acid (HCl).

* * * * *